Patented July 9, 1935

2,007,770

UNITED STATES PATENT OFFICE 2,007,770

POLYMETHYLENEDIGUANIDINE COMPOUNDS AND PROCESS OF MAKING SAID COMPOUNDS

Erich Prochnow, Berlin-Steglitz, Germany, assignor to Anticoman G. m. b. H., Berlin, Germany, a corporation of Germany No Drawing. Application April 14, 1931, Serial No. 530,147. In Germany September 1, 1930

22 Claims.  (Cl. 260—125)

My invention relates to new salts of polymethylenediguanidines easily soluble in water and in the gastric juices, and to a process of producing this substance, which is highly valuable as a therapeutic remedy. Like certain already known guanidine compounds it reduces the sugar in the blood, but in contrast with these known compounds it is, due to its easy solubility, readily assimilated by the human body without causing any inconveniences whatever, and in particular without adversely affecting the stomach or the bowels. All bad effects are effectively eliminated by the new compound, such as loss of appetite, indigestion and biliousness, and the psychial apathy and depression, which are caused by the known almost insoluble guanidine preparations, more particularly the dichlorhydrate.

My process starts with a polymethylenediguanidine with at least six methylene groups, preferably the deca or dodeca.

For producing this salt a weak acid which does not attack the organism is according to my invention allowed to act upon a compound having a basic reaction of the polymethylenediguanidine. As basic reacting compounds of the polymethylenediguanidine the carbonates or hydrates are preferred, while as weak acids ditartaric or diphosphoric acids are employed. The thus produced ditartaric or diphosphoric guanidine salts are very easily soluble in water and only above a temperature of 40° C. pass with hydrochloric acid into the difficulty soluble dichlorhydrate, so that such a conversion need not be feared in the body, the new salts being very easily assimilated by the small intestine.

By the process according to my invention preparations are produced by which the poisonousness of the guanidine is reduced to the zero point. For the production of compounds of the polymethylenediguanidines possessing basic properties, a polymethylenediamine, such as decamethylenediamine, is melted together with guanidine sulphocyanate at a temperature of approximately 130 to 160° C., introduced into an appropriate liquid or solvent and precipitated by an alkali metal carbonate or an alkali metal hydroxide. The deposit formed is washed out from the liquid in which the alkali metal sulphocyanate set free is dissolved and is then converted by means of tartaric acid or phosphoric acid to the desired compound. The product is precipitated by suitable agents, such as acetone, alcohol, or the like, washed and finally dried.

The polymethylenediguanidine biphosphate has the further advantage that it may be consumed with a pancreas preparation the ferments of which are partially decomposed, preferably such a preparation as that in which those ferments which are destroyed at 52° C. have been degradated but which still contains the sugar decomposing carboxylase. These pancreas powders are neutralized by means of sodium carbonate and allowed to stand for a considerable time.

The following may serve as examples.

*Examples*

I. 35 gr. decamethylenediamine is heated with 90 gr. guanidine sulphocyanate for two hours at 130 to 160° C., the melt introduced into 100 ccm. alcohol, precipitated by means of potassium carbonate solution, the liquid sucked off from the deposit and the deposit washed free from guanidine and sulphocyanate by means of water.

(a) After drying, heat for about 10 minutes with 28 gr. tartaric acid and 30 ccm. water on the steam-bath, cool and precipitate the product at 40° C. by means of 100 ccm. acetone, separate the acetone from the layer of oil, rewash twice with acetone and once with ether and dry in vacuo.

Yield: 71 gr. decamethylenediguanidine ditartrate.

Syrup-like, viscous, colorless body, very easily soluble in water, insoluble in acetone, chloroform and carbontetrachlorid.

or (b) After the drying boil with 40 gr. 84% phosphoric acid and 40 ccm. water until solution becomes clear, precipitate by means of alcohol, suck off the liquid after cooling, rewash the deposit with alcohol and ether and dry in drying oven.

II. Heat 35 gr. decamethylenediamine with 90 gr. guanidine sulphocyanate for 2 hours at 130 to 160° C., introduce the hot melt into cold water, suck off the liquid after cooling and wash the crystalline deposit with cold water. Dissolve the crystalline deposit in sufficient boiling water and in its hot state precipitate by means of 65 gr. 33% aqueous potash lye. After cooling, suck off the liquid from the deposit, rewash the deposit with cold water.

The further treatment is as stated in Example I under headings (a) or (b).

After treatment according to (b) there is obtained a yield of: 76 gr. decamethylenediguanidine diphosphate.

Snow-white, fine grained powder, melting point 110° C., easily soluble in water, with difficulty soluble in hot alcohol, insoluble in ether.

I claim as my invention:

1. The process of producing salts of the polymethylenediguanidines of the group of polymethylenediguanidines containing from 6 to 12 methylene groups and substantially easily soluble in water and in the gastric juices, which consists in allowing weak acids not liable to attack the human organism to act upon compounds of the polymethylenediaguanidine having basic reactions.

2. The process of producing salts of the polymethylenediguanidines of the group of polymethylenediguanidines containing from six to twelve methylene groups and substantially easily soluble in water and in the gastric juices, which consists in allowing weak acids not liable to attack the human organism to act upon carbonates of the polymethylenediguanidines.

3. The process of producing salts of the polymethylenediguanidines of the group of polymethylenediguanidines containing from six to twelve methylene groups and substantially easily soluble in water and in the gastric juices, which consists in allowing weak acids not liable to attack the human organism to act upon hydroxides of the polymethylenediguanidines.

4. The process of producing salts of the polymethylenediguanidines of the group of polymethylenediguanidines containing from six to twelve methylene groups and substantially easily soluble in water and in the gastric juices, which consists in allowing tartaric acid to act upon compounds of the polymethylenediguanidine having basic reactions.

5. The process of producing salts of the polymethylenediguanidines of the group of polymethylenediguanidines containing from six to twelve methylene groups and substantially easily soluble in water and in the gastric juices, which consists in allowing phosphoric acid to act upon compounds of the polymethylenediguanidine having basic reactions.

6. The process of producing compounds of the polymethylenediguanidines having a basic reaction which consists in melting a polymethylenediamine of the group of polymethylenediamines containing from six to twelve methylene groups with guanidine sulphocyanate, at approximately 130 to 160° C., precipitating from the melt by means of an alkali metal compound a compound of the polymethylenediguanidine of basic reaction within a liquid indifferent to the reaction and in which the alkaline sulphocyanate set free dissolves, washing the deposit with suitable agents and drying.

7. The process of producing compounds of the polymethylenediguanidines having a basic reaction, which consists in melting a polymethylenediamine of the group of polymethylenediamines containing from six to twelve methylene groups with guanidine sulphocyanate at approximately 130 to 160° C., precipitating from the melt by means of an alkali metal hydroxide a compound of the polymethylenediguanidine of basic reaction within a liquid indifferent to the reaction, and in which the alkali metal sulphocyanate set free dissolves, washing the deposit with suitable agents and drying.

8. The process of producing compounds of the polymethylenediguanidines having a basic reaction which consists in melting a polymethylenediamine of the group of polymethylenediamines containing from six to twelve methylene groups with guanidine sulphocyanate, at approximately 130 to 160° C., precipitating from the melt by means of an alkali metal carbonate a compound of the polymethylenediguanidine of basic reaction in a liquid indifferent to the reaction and in which the alkali metal sulphocyanate set free dissolves, washing the deposit with suitable agents and drying.

9. The process of producing salts of the polymethylenediguanidines easily soluble in water and the gastric juices, which consists in melting a polymethylenediamine of the group of polymethylenediamines containing from six to twelve methylene groups with guanidine sulphocyanate, at approximately 130 to 160° C., precipitating by means of an alkali metal compound a compound of the polymethylenediguanidine of basic reaction in a liquid indifferent to the reaction and in which the alkali metal sulphocyanate set free dissolves, washing the deposit out by suitable means and drying, heating the basic reacting compound of the polymethylenediguanidine with phosphoric acid and converting it to the desired product, and washing and drying the product of the precipitation.

10. The process of producing salts of the polymethylenediguanidines easily soluble in water and the gastric juices, which consists in melting a polymethylenediamine of the group of polymethylenediamines containing from six to twelve methylene groups with guanidine sulphocyanate, at approximately 130 to 160° C., precipitating by means of an alkali metal compound the compound of polymethylenediguanidine of basic reaction in a liquid indifferent to the reaction and in which the alkali metal sulphocyanate set free dissolves, washing the deposit out by suitable means and drying, heating the basic reacting compound of the polymethylenediguanidine with tartaric acid and converting it to the desired product, and washing and drying the product of the precipitation.

11. As a new product, a basic compound of the polymethylenediguanidines obtained by melting a polymethylenediguandine of the group of polymethylenediguanidines containing from six to twelve methylene groups with guanidine sulphocyanate and precipitating by means of alkali metal compound.

12. As a new product, the salt of the polymethylenediguanidines easily soluble in water and in the gastric juices of the group of polymethylenediguanidine containing from six to twelve methylene groups, obtained by fusing a polymethylenediamine of from six to twelve methylene groups with guanidine sulphocyanate and by precipitating by means of an alkali metal compound and conversion of the thus obtained basic reacting compound of the polymethylenediguanidine by means of a weak acid not liable to attack the human organism.

13. As a new product, the salt of decamethylenediguanidine easily soluble in water and in the gastric juices, obtained by melting together decamethylenediamine with guanidine sulphocyanate, precipitating by means of an alkali metal hydroxide and converting the hydroxide of the decamethylenediguanidine thus formed into the desired product by means of a weak acid not liable to attack the human organism.

14. As a new product, the salt of decamethylenediguanidine easily soluble in water and in the gastric juices, obtained by melting together decamethylenediamine with guanidine sulphocyanate, precipitating by means of an alkali metal carbonate and converting the carbonate of the decamethylenediguanidine thus formed into the desired product by means of a weak acid not liable to attack the human organism.

15. As a new product, the salt of decamethylenediguanidine easily soluble in water and in the gastric juices, obtained by melting together decamethylenediamine with guanidine sulphocyanate, precipitating by means of an alkali metal hydroxide and converting the hydroxide of the decamethylenediguanidine thus formed by means of tartaric acid.

16. As a new product the salt of decamethylenediguanidine easily soluble in water and in the gastric juices, obtained by melting together decamethylenediamine with guanidine sulphocyanate, precipitating by means of an alkali metal hydroxide and converting the hydroxide of the decamethylenediguanidine thus formed by means of phosphoric acid.

17. As a new product, polymethylenediguanidine ditartrate of the group of polymethylenediguanidine ditartrates containing from six to twelve methylene groups produced by reacting polymethylenediguanidines having basic reactions with tartaric acid.

18. As a new product, polymethylenediguanidine diphosphate of the group of polymethylenediguanidine diphosphates containing of from six to twelve methylene groups produced by reacting polymethylenediguanidines having basic reactions with phosphoric acid.

19. The process of producing compounds of polymethylenediguanidines having a basic reaction which consists in melting a polymethylenediamine of the group of polymethylenediamines containing from six to twelve methylene groups with guanidine sulphocyanate, at approximately 130 to 160° C. dissolving the melt within a solvent and precipitating from the solvent by means of an alkali metal compound, the compound of the polymethylenediguanidine of basic reaction within a liquid indifferent to the reaction and in which the alkali metal sulphocyanate set free dissolves, washing the deposit with suitable agents and drying.

20. The process of producing compounds of the polymethylenediguanidines having a basic reaction which consists in melting a polymethylenediamine of the group of polymethylenediamines containing from six to twelve methylene groups with guanidine sulphocyanate, at approximately 130 to 160° C., dissolving the melt in hot water and precipitating from the solvent by means of an alkali metal compound, the compound of the polymethylenediguanidine of basic reaction within a liquid indifferent to the reaction and in which the alkali metal sulphocyanate set free dissolves, washing the deposit with suitable agents and drying.

21. The process of producing compounds of the polymethylenediguanidines having a basic reaction which consists in melting a polymethylenediamine of the group of polymethylenediamines containing from six to twelve methylene groups with guanidine sulphocyanate, at approximately 130 to 160° C., dissolving the melt within alcohol and precipitating from the solvent by means of an alkali metal compound, the compound of the polymethylenediguanidine of basic reaction within a liquid indifferent to the reaction and in which the alkali metal sulphocyanate set free dissolves, washing the deposit with suitable agents and drying.

22. A new product suitable for use internally for regulating the sugar content of the blood, consisting of a polymethylenediguanidine salt of the group of polymethylenediguanidine salts containing from six to twelve polymethylene groups easily soluble in water and in the gastric juice.

ERICH PROCHNOW.